United States Patent
Jan et al.

(10) Patent No.: US 10,656,677 B2
(45) Date of Patent: May 19, 2020

(54) DOCKING STATION AND ELECTRONIC APPARATUS

(71) Applicants: Cheng-Shiue Jan, Taipei (TW); Wei-Hao Lan, Taipei (TW); Cheng-Ya Chi, Taipei (TW); Jyh-Chyang Tzou, Taipei (TW); Hsin Yeh, Taipei (TW)

(72) Inventors: Cheng-Shiue Jan, Taipei (TW); Wei-Hao Lan, Taipei (TW); Tsai-Yu Lin, New Taipei (TW); Cheng-Ya Chi, Taipei (TW); Jyh-Chyang Tzou, Taipei (TW); Hsin Yeh, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 15/983,110

(22) Filed: May 18, 2018

(65) Prior Publication Data

US 2018/0335803 A1 Nov. 22, 2018

Related U.S. Application Data

(60) Provisional application No. 62/507,794, filed on May 18, 2017.

(51) Int. Cl.
*G06F 1/16* (2006.01)
*H01R 13/62* (2006.01)
(Continued)

(52) U.S. Cl.
CPC ....... *G06F 1/1632* (2013.01); *H01R 13/6205* (2013.01); *H01R 13/62933* (2013.01);
(Continued)

(58) Field of Classification Search
CPC .............. G06F 1/1632; H01R 13/6205; H01R 13/62933
See application file for complete search history.

(56) References Cited

U.S. PATENT DOCUMENTS 8,599,542 B1 * 12/2013 Healey ................. G06F 1/1626
345/168
8,644,018 B2 * 2/2014 Hung .................... G06F 1/1632
16/302

(Continued)

FOREIGN PATENT DOCUMENTS

| TW | I456375 | 10/2014 |
|---|---|---|
| TW | M535338 | 1/2017 |
| TW | I571194 | 2/2017 |

OTHER PUBLICATIONS

"Office Action of Taiwan Counterpart Application," dated Dec. 25, 2018, p. 1-p. 4.

*Primary Examiner* — Nidhi Thaker
(74) *Attorney, Agent, or Firm* — JCIPRNET

(57) ABSTRACT

A docking station includes a body portion and a pivoting portion. The body portion has a guiding surface. The pivoting portion is pivoted with the body portion and has a connector. A driving force is generated when a portable electronic component abuts against the guiding surface of the body portion and slides toward the pivoting portion, the pivoting portion is driven to pivot from a first position to a second position to expose the connector so as to electrically connect with the portable electronic component.

10 Claims, 13 Drawing Sheets

(51) Int. Cl.
    *H01R 13/629*     (2006.01)
    *H02J 7/00*     (2006.01)
    *H01R 13/453*     (2006.01)
    *H01R 24/00*     (2011.01)

(52) U.S. Cl.
    CPC ........ *H02J 7/0044* (2013.01); *H01R 13/4532* (2013.01); *H01R 24/005* (2013.01)

(56) References Cited

U.S. PATENT DOCUMENTS

| | | | | |
|---|---|---|---|---|
| 9,218,025 | B2 * | 12/2015 | Bates | G06F 1/1662 |
| 9,429,994 | B1 * | 8/2016 | Vier | G06F 1/1656 |
| 9,910,455 | B1 * | 3/2018 | Morrison | H01F 7/0252 |
| 2011/0292584 | A1 * | 12/2011 | Hung | G06F 1/1626 |
| | | | | 361/679.26 |
| 2012/0287562 | A1 * | 11/2012 | Wu | G06F 1/1626 |
| | | | | 361/679.01 |
| 2013/0170126 | A1 * | 7/2013 | Lee | G06F 1/1654 |
| | | | | 361/679.17 |
| 2015/0138721 | A1 * | 5/2015 | Liang | G06F 1/1632 |
| | | | | 361/679.44 |
| 2016/0282909 | A1 * | 9/2016 | Tzou | G06F 1/1626 |
| 2017/0220076 | A1 * | 8/2017 | Gerbus | G06F 1/1681 |

* cited by examiner

DOCKING STATION AND ELECTRONIC APPARATUS

CROSS-REFERENCE TO RELATED APPLICATION

This application claims the priority benefits of U.S. provisional application Ser. No. 62/507,794, filed on May 18, 2017. The entirety of the above-mentioned patent application is hereby incorporated by reference herein and made a part of this specification.

BACKGROUND OF THE INVENTION

Technical Field

The invention relates to a docking station and an electronic apparatus, and more particularly, the invention relates to a docking station capable of electrically connecting with a portable electronic component and an electronic apparatus adopting the docking station.

Description of Related Art

The main difference between the portable electronic apparatuses and the conventional desktop computers is that the portable electronic apparatuses feature lightweight and compact sizes, so the portable computers can be easily carried around by computer users and allow users to conveniently work on the computers in various environments. Nevertheless, the portable electronic apparatuses are limited by their light and small design requirements, their functionality and expandability cannot be compared with the desktop computers featuring larger sizes for computer operation. Accordingly, a current portable electronic apparatus is usually provided with a docking station so that the docking station can provide a carrying platform for the portable electronic apparatus, and at the same time, additional usage methods and functions can also be provided to the portable electronic apparatus, for instance, the expansion of a power supply, a keyboard input or a related human-machine control interface, a port, or a speaker and the like of the portable electronic apparatus can achieve the complete function of a current desktop computer when the portable electronic apparatus is not in a portable state. However, to achieve the above functions, structural and electrical connections need to be completed between the portable electronic apparatus and the docking station at the same time. In a general docking station, a hook and an electrical connector are exposed outside the casing of the docking station most of the time, so the hook and the electrical connector may be damaged easily owing to collisions, and the appearance of the docking station is also less likely to be kept simple.

SUMMARY OF THE INVENTION

The invention provides a docking station in which a pivoting portion may automatically pivot from a first position to a second position to expose a connector, so as to electrically connect with a portable electronic component.

The invention further provides an electronic apparatus including the docking station and may be used in a more intuitive and convenient way.

In an embodiment of the invention, a docking station includes a body portion and a pivoting portion. The body portion has a guiding surface. The pivoting portion is pivoted with the body portion and has a connector. A driving force is generated when a portable electronic component abuts against the guiding surface of the body portion and slides toward the pivoting portion, and the pivoting portion is driven to pivot from a first position to a second position to expose the connector so as to electrically connect with the portable electronic component.

In an embodiment of the invention, the docking station further includes a first magnetic block, a pivoting component, and a second magnetic block. The first magnetic block is disposed in the body portion. The pivoting component is disposed in the body portion and has a first end and a second end, wherein the first end is adapted to protrude from the guiding surface. The second magnetic block is disposed on the second end of the pivoting component.

In an embodiment of the invention, a magnetic attraction force is generated between the second magnetic block and the pivoting portion when the pivoting portion is located at the first position.

In an embodiment of the invention, the portable electronic component includes a magnetic device. A magnetic attraction force is generated between the magnetic device and the first magnetic block when the portable electronic component abuts against the guiding surface of the body portion and slides towards the pivoting portion, the portable electronic component pushes against the first end of the pivoting component, the pivoting component is driven to pivot and to push against the pivoting portion, and the pivoting portion pivots from the first position to the second position to expose the connector through gravity.

In an embodiment of the invention, the docking station further includes a magnetic block and an elastic member. The magnetic block is disposed in the body portion. The elastic member is connected to the body portion and the magnetic block.

In an embodiment of the invention, the magnetic block magnetically attracts the pivoting portion when the pivoting portion is located at the first position.

In an embodiment of the invention, the portable electronic component includes a magnetic device. A magnetic repulsion force is generated between the magnetic device and the magnetic block when the portable electronic component abuts against the guiding surface of the body portion and slides toward pivoting portion, the magnetic block is driven to move in a direction away from the pivoting portion and compresses the elastic member, and the pivoting portion pivots from the first position to the second position to expose the connector through gravity.

In an embodiment of the invention, the docking station further includes a first magnetic sliding member, a second magnetic sliding member, and a magnetic component. The first magnetic sliding member is disposed in the body portion and has a sliding block. The second magnetic sliding member is disposed in the body portion and has a sliding groove, at least one first magnetic block, and at least one second magnetic block. The first magnetic sliding member is slidably disposed on the second magnetic sliding member, and the sliding block is located in the sliding groove. Magnetism of the at least one first magnetic block and magnetism of the at least one second magnetic block are different. The at least one first magnetic block and the at least one second magnetic block are separated from one another. The magnetic component is disposed in the pivoting portion and includes at least one third magnetic block and at least one fourth magnetic block. The at least one third magnetic block and the at least one fourth magnetic block are separated from one another. Magnetism of the at least one third magnetic block and the magnetism of the at least one second magnetic block are identical. Magnetism of the at least one fourth magnetic block and the magnetism of the at least one first magnetic block are identical.

In an embodiment of the invention, when the pivoting portion is located at the first position, a magnetic attraction force is generated as the at least one third magnetic block of the magnetic component corresponds to the at least one first magnetic block of the second magnetic sliding member. A magnetic attraction force is generated as the at least one fourth magnetic block of the magnetic component corresponds to the at least one second magnetic block of the second magnetic sliding member.

In an embodiment of the invention, the portable electronic component includes a magnetic device. A magnetic repulsion force is generated between the magnetic device and the first magnetic sliding member when the portable electronic component abuts against the guiding surface of the body portion and slides toward the pivoting portion, the sliding block of the first magnetic sliding member is driven to slide in the sliding groove of the second magnetic sliding member, a magnetic repulsion force is generated as the at least one first magnetic block of the second magnetic sliding member is at least enabled to move to the at least one fourth magnetic block corresponding to the magnetic component, and the pivoting portion pivots from the first position to the second position to expose the connector through the magnetic repulsion force.

In an embodiment of the invention, the first magnetic sliding member moves in a first direction and the second magnetic sliding member moves in a second direction when the sliding block of the first magnetic sliding member slides in the sliding groove of the second magnetic sliding member, and the first direction is perpendicular to the second direction.

In an embodiment of the invention, the docking station further includes a link and an elastic member. The link is connected to the first magnetic sliding member and the body portion. The elastic member is disposed between the body portion and one end of the link relatively away from the first magnetic sliding member.

In an embodiment of the invention, the docking station further includes a plurality of position limiting pillars disposed in the body portion, wherein the first magnetic sliding member is slidably disposed on the position limiting pillars.

In an embodiment of the invention, the docking station further includes a hook component, a plurality of magnetic blocks, and at least one elastic member. The hook component is pivoted into the body portion and is adapted to pivot between an engaging position and an open position. The hook component includes a hook body and at least one hook. The magnetic blocks are disposed on the hook body of the hook component. The elastic member is disposed between the body portion and the pivoting portion.

In an embodiment of the invention, the at least one hook of the hook component is engaged with an engaging slot of the pivoting portion when the pivoting portion is located at the first position, and that the hook component is located at the engaging position.

In an embodiment of the invention, the portable electronic component includes a magnetic device. A magnetic attraction force is generated between the magnetic device and the magnetic blocks when the portable electronic component abuts against the guiding surface of the body portion and slides towards the pivoting portion, the hook component is driven to pivot from the engaging position to the open position, the at least one hook of the hook component is not engaged with the engaging slot of the pivoting portion, and the pivoting portion pivots from the first position to the second position to expose the connector through elastic potential energy released by the elastic member.

In an embodiment of the invention, the docking station further includes a plurality of positioning magnets disposed on the body portion separately from one another.

In an embodiment of the invention, the hook component further includes a return spring connected to the body portion and the hook body.

In an embodiment of the invention, the portable electronic component includes an electrical connector. The electrical connector of the portable electronic component electrically connects with the connector of the pivoting portion when the pivoting portion is located at the second position, and that the portable electronic component is positioned on the pivoting portion.

In an embodiment of the invention, the body portion has an accommodating groove. The connector of the pivoting portion is stored in the accommodating groove when the pivoting portion is located at the first position.

In an embodiment of the invention, an electronic apparatus includes a portable electronic component and a docking station. The docking station is adapted to electrically connect with the portable electronic component and includes a body portion and a pivoting portion. The body portion has a guiding surface. The pivoting portion is pivoted with the body portion and has a connector. A driving force is generated when a portable electronic component abuts against the guiding surface of the body portion and slides toward the pivoting portion, and the pivoting portion is driven to pivot from a first position to a second position to expose the connector so as to electrically connect with the portable electronic component.

To sum up, in the design of the docking station of the embodiments of the invention, the driving force is generated when the portable electronic component abuts against the guiding surface of the body portion and slides toward the pivoting portion, and the pivoting portion is driven to pivot from the first position to the second position to expose the connector so as to electrically connect with the portable electronic component. That is, the design of the docking station allows the docking station to keep a simple appearance and to be used in a more intuitive and convenient way. In other words, when the docking station does not carry the portable electronic component, the connector of the pivoting portion is hidden without being exposed, so that the connector is protected from being damaged by dusts or external forces.

To make the aforementioned and other features and advantages of the invention more comprehensible, several embodiments accompanied with drawings are described in detail as follows.

DESCRIPTION OF THE EMBODIMENTS

Figure 1A:
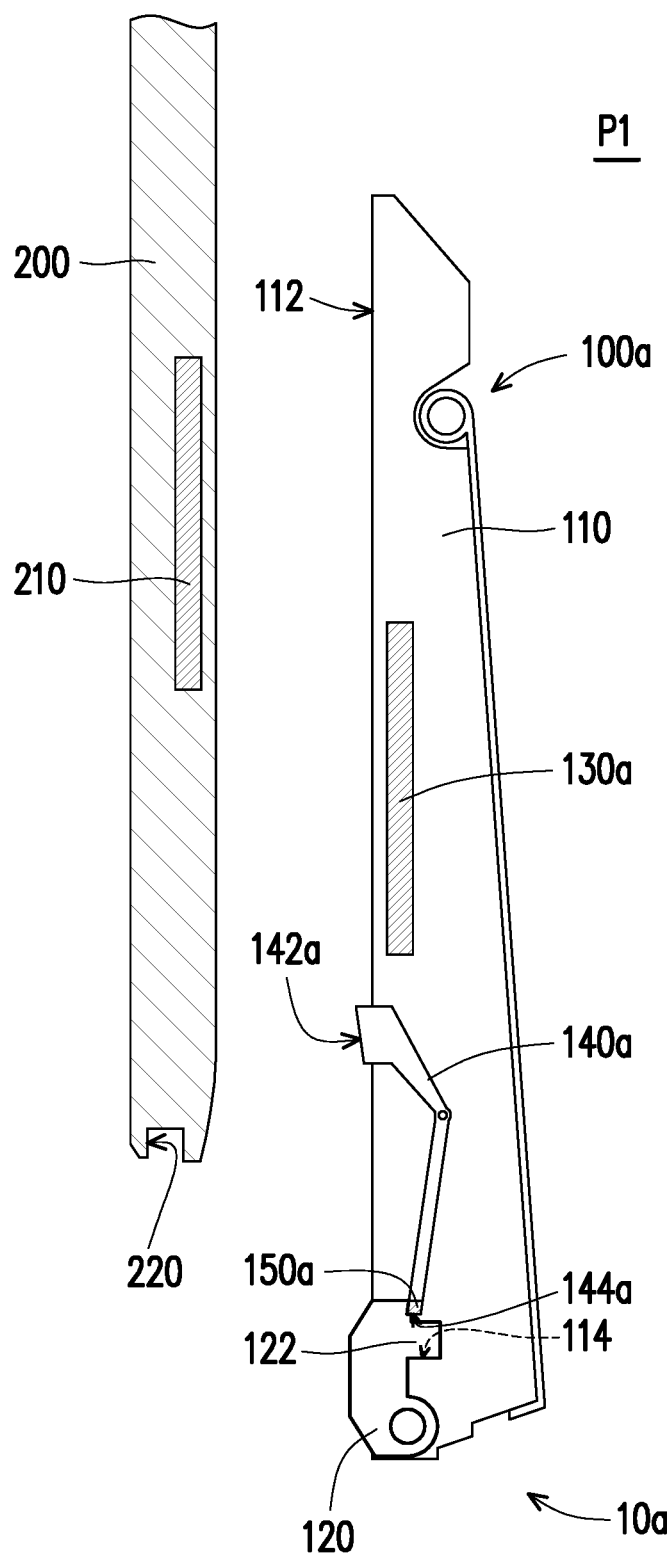
FIG. 1A to FIG. 1D are schematic cross-sectional views illustrating a flow process of assembling a docking station and a portable electronic component into an electronic apparatus according to an embodiment of the invention.

FIG. 1A to FIG. 1D are schematic cross-sectional views illustrating a flow process of assembling a docking station and a portable electronic component into an electronic apparatus according to an embodiment of the invention. With reference to FIG. 1A, a docking station 100a of this embodiment is adapted to electrically connect with a portable electronic component 200, wherein the portable electronic component 200 includes a magnetic device 210 and an electrical connector 220.

To be specific, the docking station 100a of this embodiment includes a body portion 110 and a pivoting portion 120. The body portion 110 has a guiding surface 112. The pivoting portion 120 is pivoted with the body portion 110 and has a connector 122. Further, the docking station 100a further includes a first magnetic block 130a, a pivoting component 140a, and a second magnetic block 150a. The first magnetic block 130a is disposed in the body portion 110. The pivoting component 140a is disposed in the body portion 110 and has a first end 142a and a second end 144a, wherein the first end 142a is adapted to protrude from the guiding surface 112 of the body portion 110. The second magnetic block 150a is disposed on the second end 144a of the pivoting component 140a and is adapted to generate a magnetic attraction force with the pivoting portion 120. In addition, the body portion 110 of this embodiment has an accommodating groove 114.

With reference to FIG. 1A, when the pivoting portion 120 is located at a first position P1, the magnetic attraction force is generated between the second magnetic block 150a and the pivoting portion 120, and that the connector 122 of the pivoting portion 120 is stored in the accommodating groove 114. That is, when the pivoting portion 120 is located at the first position P1, the connector 122 of the pivoting portion 120 is hidden without being exposed, and the connector 122 is protected from being damaged by dusts or external forces through such design of the docking station 100a.

Figure 1B:
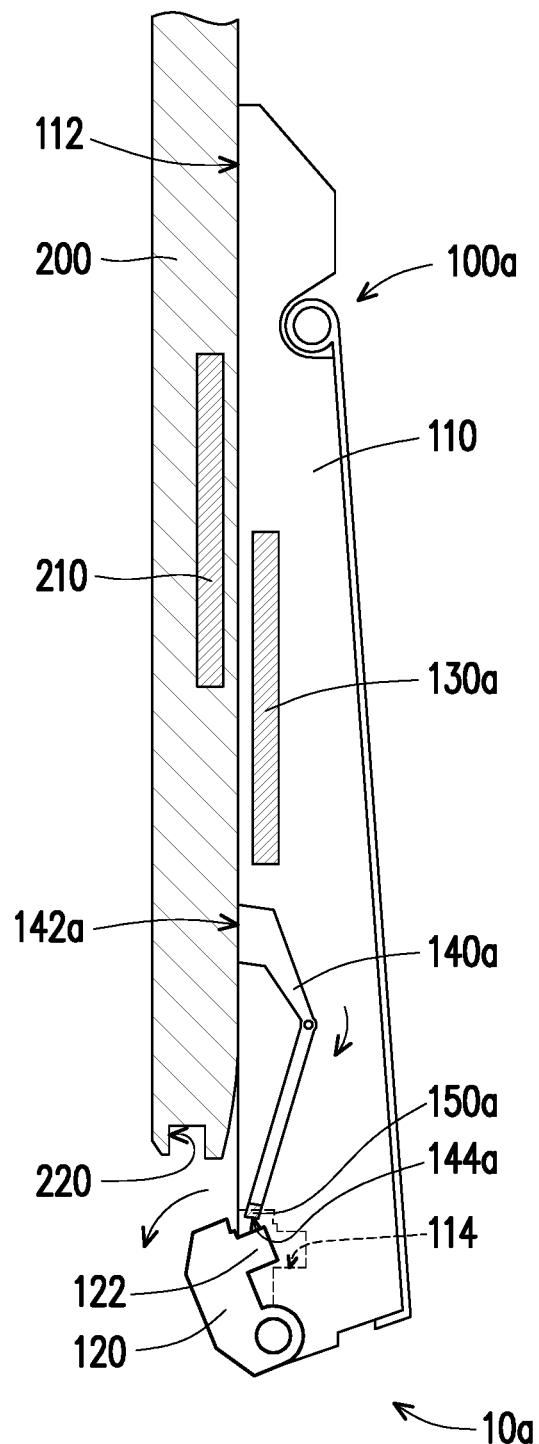

Next, with reference to FIG. 1A and FIG. 1B together, when the portable electronic component 200 gradually approaches the body portion 110 and the portable electronic component 200 abuts against the guiding surface 112 of the body portion 110 and slides toward the pivoting portion 120, a driving force is generated. That is, a magnetic attraction force is generated between the magnetic device 200 and the first magnetic block 130a. At this time, the portable electronic component 200 pushes the first end 142a of the pivoting component 140a, and the pivoting component 140a is driven to pivot and to push against the pivoting portion 120.

Figure 1C:
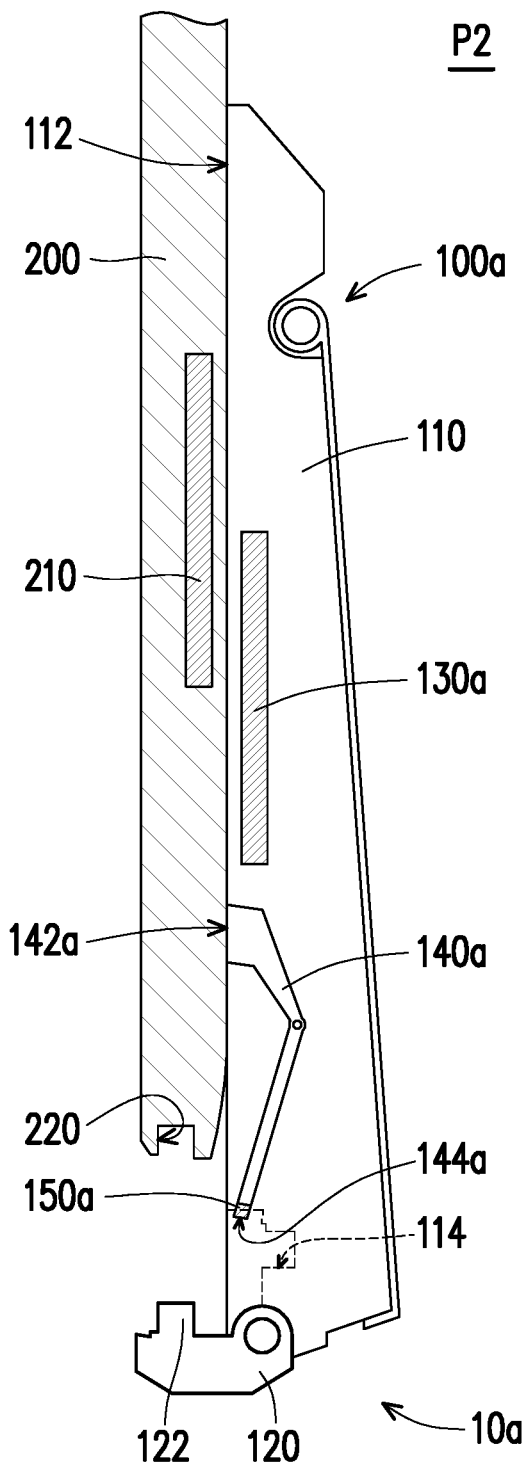

Next, with reference to FIG. 1B and FIG. 1C together, the pivoting portion 120 is then pushed against by the second end 144a of the pivoting component 140a to pivot from the first position P1 to a second position P2 to expose the connector 122 of the pivoting portion 120 through gravity. That is, the pivoting portion 120 automatically pivots to expose the connector 122 by a mechanical force. At this time, the first end 142a of the pivoting component 140a is hidden in the body portion 110, and magnetism of the second end 144a of the pivoting component 140a and magnetism of the pivoting portion 120 do not attract each other.

Figure 1D:
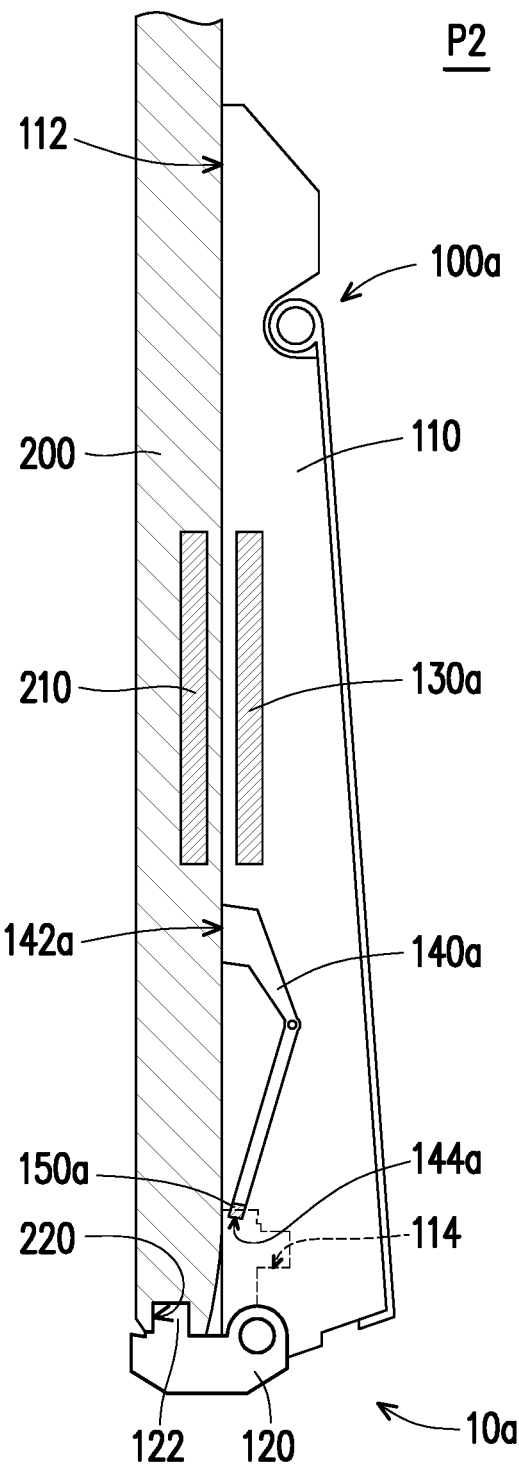

Finally, with reference to FIG. 1D, when the pivoting portion 120 is located at the second position P2, the electrical connector 220 of the portable electronic component 200 electrically connects with the connector 122 of the pivoting portion 120, so that the portable electronic component 200 is positioned on the pivoting portion 120. Herein, the docking station 100a and the portable electronic component 200 are thereby assembled into an electronic apparatus 10a.

When the pivoting portion 120 of the docking station 100a is intended to return back to the first position P1 from the second position P2, the pivoting portion 120 may be manually operated to be pivoted to the first position P1, and that the magnetic attraction force is generated between the second magnetic block 150a and the pivoting portion 120, and thereby the connector 122 of the pivoting portion 120 is stored in the accommodating groove 114.

In short, in the design of the docking station 100a of this embodiment, when the portable electronic component 200 abuts against the guiding surface 112 of the body portion 110 and slides toward the pivoting portion 120, the driving force is generated, and the pivoting portion 120 is driven to pivot from the first position P1 to the second position P2 to expose the connector 122, so as to electrically connect with the portable electronic component 200. That is, the design of the docking station 100a allows the docking station 100a to keep a simple appearance and to be used in a more intuitive and convenient way. In other words, when the docking station 100a does not carry the portable electronic component 200, the connector 122 of the pivoting portion 120 is hidden without being exposed, so that the connector 122 is protected from being damaged by dusts or external forces.

It should be noted that the reference numerals and a part of the contents in the previous embodiment are used in the following embodiments, in which identical reference numerals indicate identical or similar components, and repeated description of the same technical contents is omitted. Please refer to the descriptions of the previous embodiment for the omitted contents, which will not be repeated hereinafter.

Figure 2A:
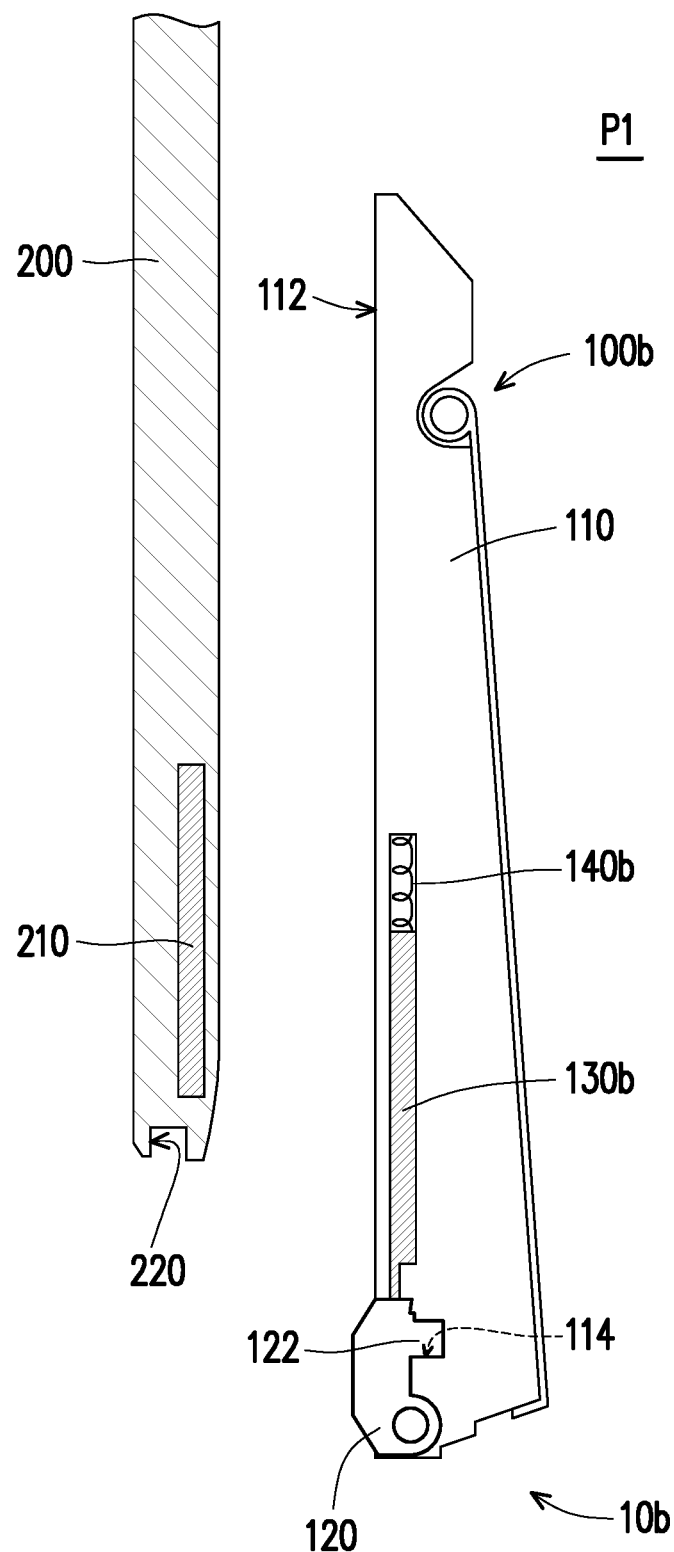
FIG. 2A to FIG. 2D are schematic cross-sectional views illustrating a flow process of assembling a docking station and a portable electronic component into an electronic apparatus according to another embodiment of the invention.

FIG. 2A to FIG. 2D are schematic cross-sectional views illustrating a flow process of assembling a docking station and a portable electronic component into an electronic apparatus according to another embodiment of the invention. With reference to FIG. 1A and FIG. 2A, a docking station 100b of this embodiment is similar to the docking station 100a of FIG. 1A, and a difference therebetween is: other members are used to replace the first magnetic block 130a, the pivoting component 140a, and the second magnetic block 150a of FIG. 1A in the docking station 100b of this embodiment. To be specific, the docking station 100b of this embodiment further includes a magnetic block 130b and an elastic member 140b. The magnetic block 130b is disposed in the body portion 110. The elastic member 140b is connected to the body portion 110 and the magnetic block 130b.

Figure 2B:
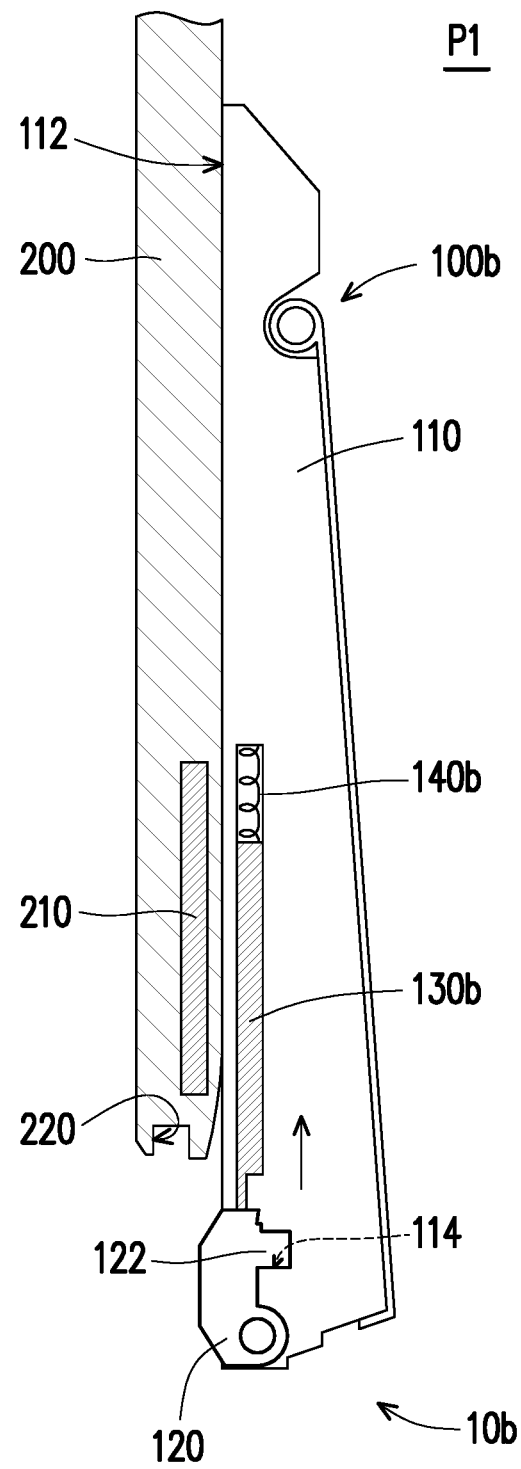

With reference to FIG. 2A and FIG. 2B together, when the pivoting portion 120 is located at the first position P1, the magnetic block 130b magnetically attracts the pivoting portion 120. At this time, the connector 122 of the pivoting portion 120 is hidden without being exposed, and the connector 122 is thereby protected from being damaged by dusts or external forces through such design of the docking station 100b.

Figure 2C:
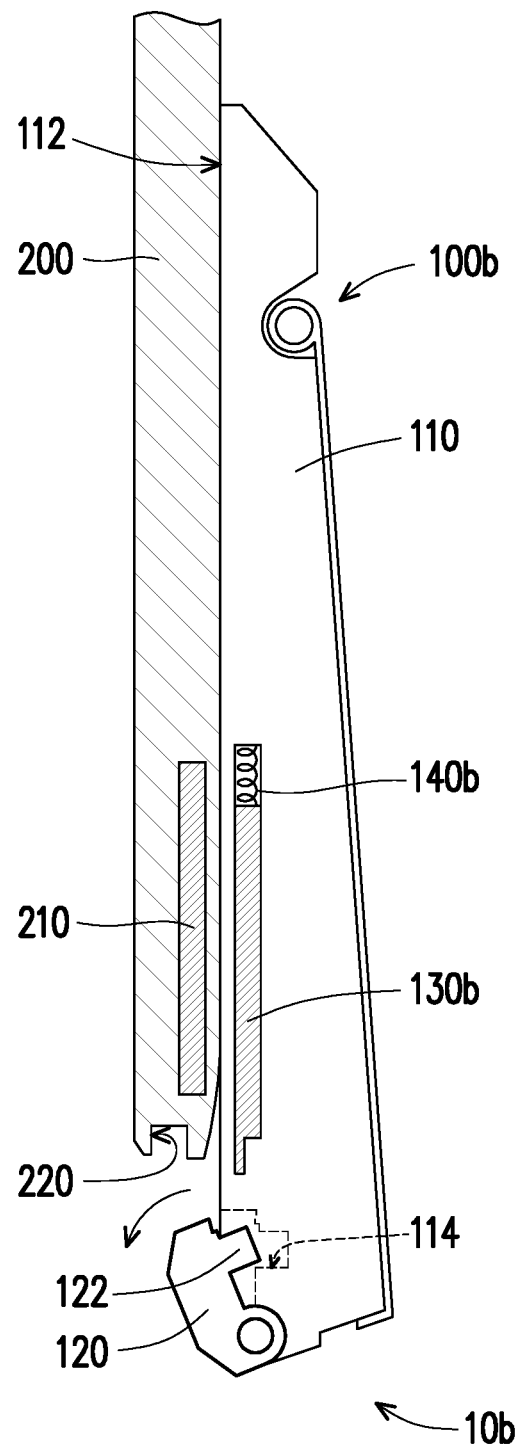

Immediately afterwards, with reference to FIG. 2B and FIG. 2C together, when the portable electronic component 200 abuts against the guiding surface 112 of the body portion 110 and slides toward the pivoting portion 120, a magnetic repulsion force is generated between the magnetic device 210 and the magnetic block 130*b*, and the magnetic block 130*b* is driven to move in a direction away from the pivoting portion 120 and compress the elastic member 140*b*. At this time, the magnetic block 130*b* is away from the pivoting portion 120.

Figure 2D:
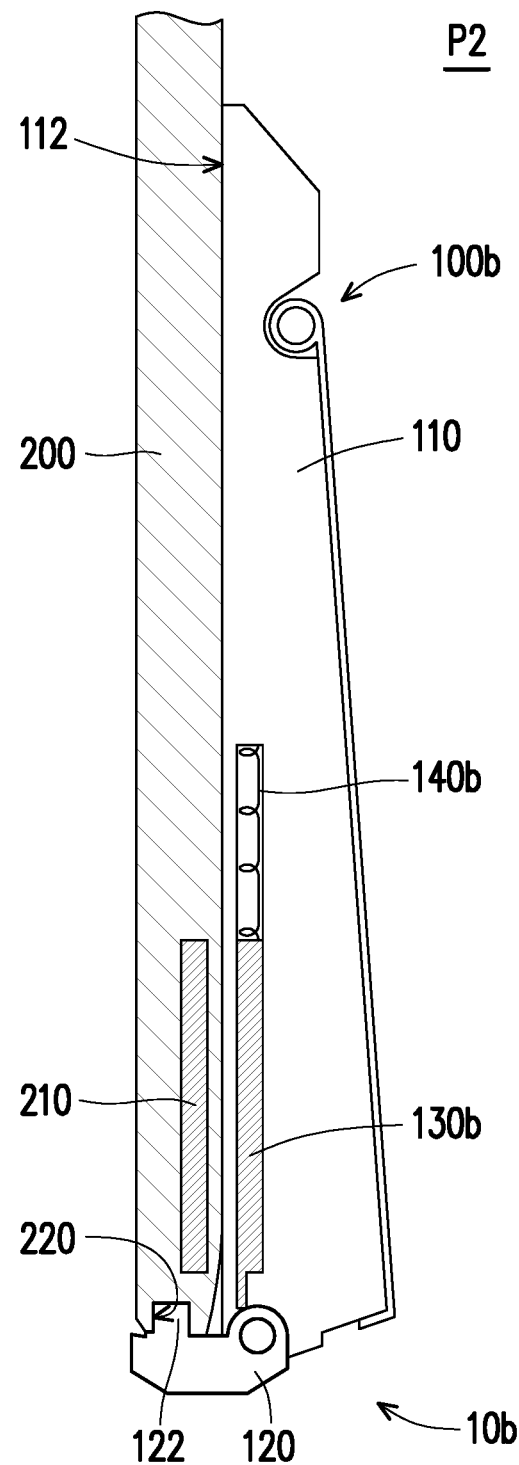

After that, with reference to FIG. 2C and FIG. 2D together, when the magnetic block 130*b* is away from (i.e., is released from) the pivoting portion 120, the pivoting portion 120 pivots from the first position P1 to the second position P2 to expose the connector 122 through gravity.

Finally, with reference to FIG. 2D, when the pivoting portion 120 is located at the second position P2, the electrical connector 220 of the portable electronic component 200 electrically connects with the connector 122 of the pivoting portion 120, so that the portable electronic component 200 is positioned on the pivoting portion 120. At this time, the docking station 100*b* and the portable electronic component 200 are thereby assembled into an electronic apparatus 10*b*.

When the pivoting portion 120 of the docking station 100*b* is intended to return back to the first position P1 from the second position P2, the pivoting portion 120 may be manually operated to be pivoted to the first position P1, and that the magnetic attraction force is generated between the magnetic block 130*b* and the pivoting portion 120, so that the connector 122 of the pivoting portion 120 is stored in the accommodating groove 114.

Figure 3A:
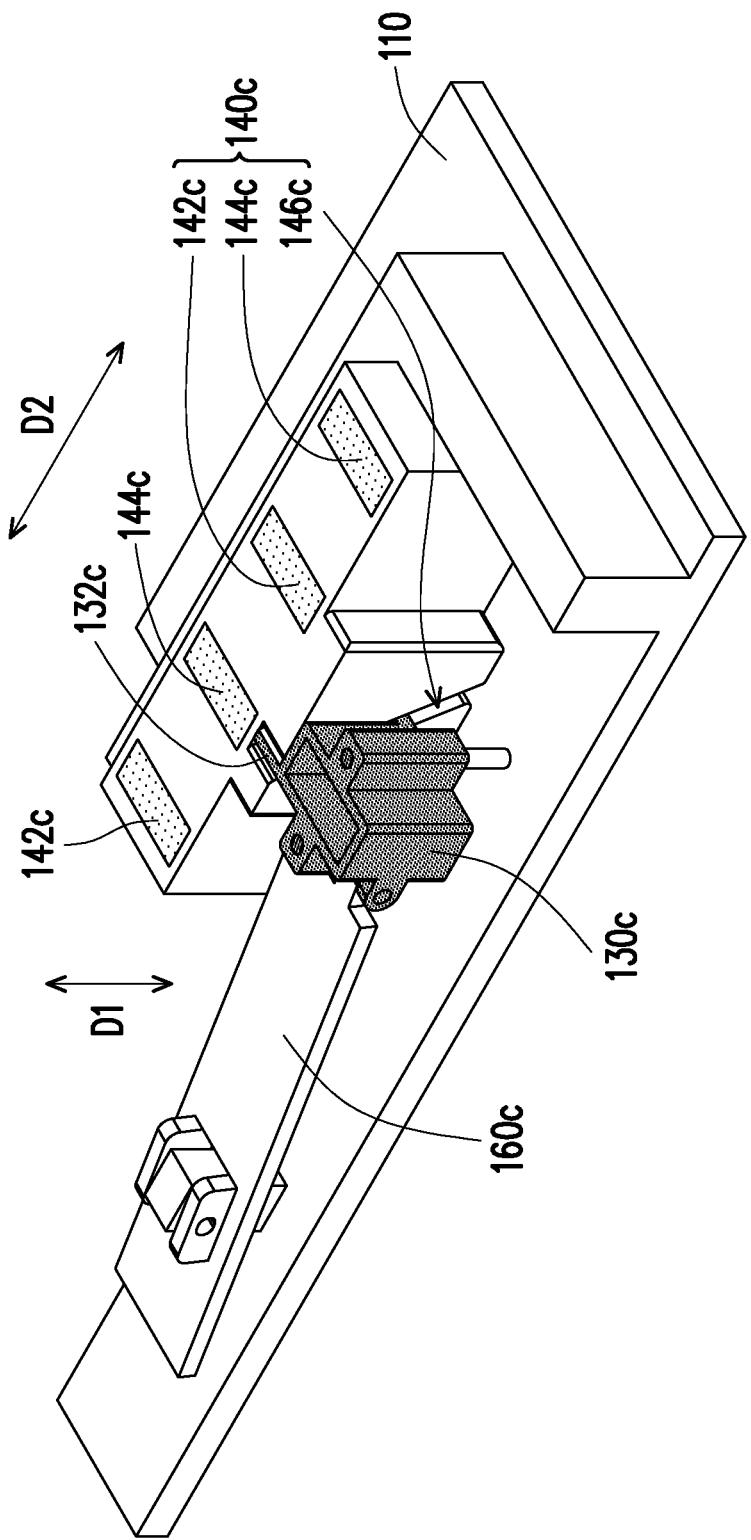
FIG. 3A is a schematic local three-dimensional view illustrating a docking station according to another embodiment of the invention.
Figure 3B:
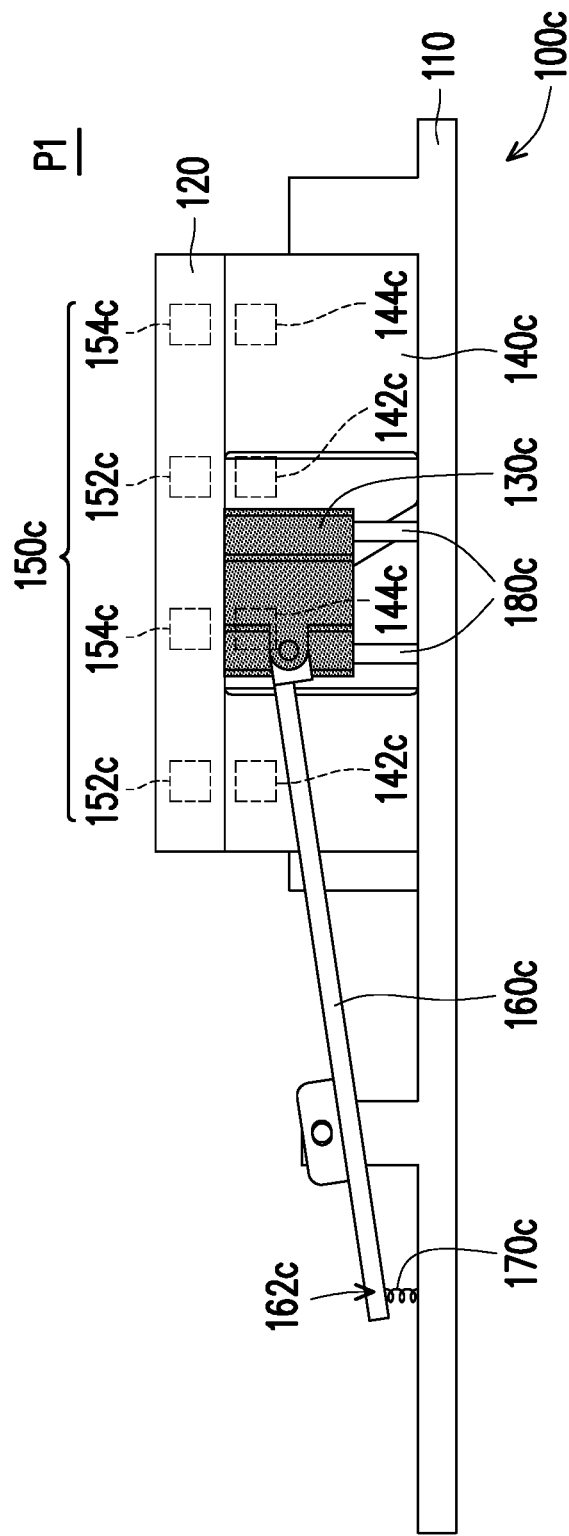
FIG. 3B and FIG. 3C are schematic cross-sectional views respectively illustrating relative positions between a pivoting portion in a first position and a second position and a body portion in the docking station of FIG. 3A.
Figure 3C:
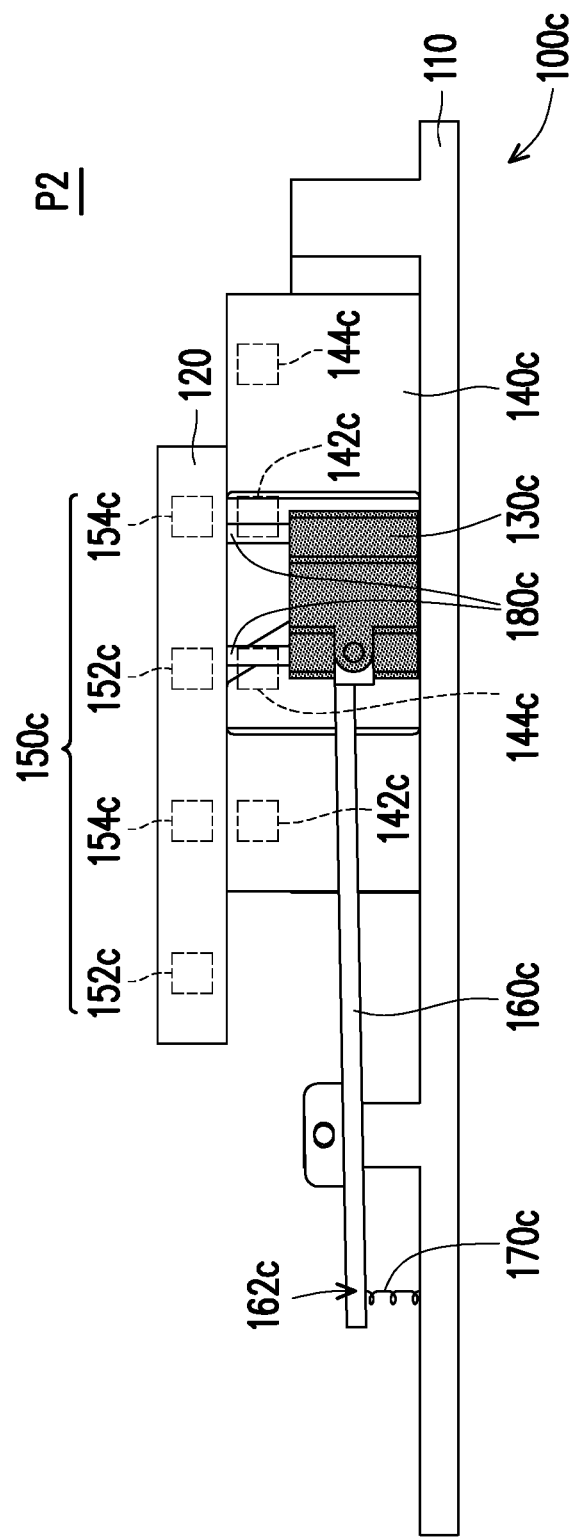

FIG. 3A is a schematic local three-dimensional view illustrating a docking station according to another embodiment of the invention. FIG. 3B and FIG. 3C are schematic cross-sectional views respectively illustrating relative positions between a pivoting portion in a first position and a second position and a body portion in the docking station of FIG. 3A. Not that in order to facilitate the illustration, a pivoting portion is omitted in FIG. 3A. With reference to FIG. 1A, FIG. 3A, and FIG. 3B, a docking station 100*c* of this embodiment is similar to the docking station 100*a* of FIG. 1A, and a difference therebetween is: other members are used to replace the first magnetic block 130*a*, the pivoting component 140*a*, and the second magnetic block 150*a* of FIG. 1A in the docking station 100*c* of this embodiment.

To be specific, the docking station 100*c* of this embodiment further includes a first magnetic sliding member 130*c*, a second magnetic sliding member 140*c*, and a magnetic component 150*c*. The first magnetic sliding member 130*c* is disposed in the body portion 110 and has a sliding block 132*c*. The second magnetic sliding member 140*c* is disposed in the body portion 110 and has a sliding groove 146*c*, at least one first magnetic block 142*c* (two are schematically illustrated herein), and at least one second magnetic block 144*c* (two are schematically illustrated herein). The first magnetic sliding member 130*c* is slidably disposed on the second magnetic sliding member 140*c*, and the sliding block 132*c* is located in the sliding groove 146*c*. Magnetism of the first magnetic blocks 142*c* and magnetism of the second magnetic blocks 144*c* are different. The first magnetic blocks 142*c* and the second magnetic blocks 144*c* are separated from one another. The magnetic component 150*c* is disposed in the pivoting portion 120 and includes at least one third magnetic block 152*c* (two are schematically illustrated herein) and at least one fourth magnetic block 154*c* (two are schematically illustrated herein). The third magnetic blocks 152*c* and the fourth magnetic blocks 154*c* are separated from one another. Magnetism of the third magnetic blocks 152*c* and the magnetism of the second magnetic blocks 144*c* are identical. Magnetism of the fourth magnetic blocks 154*c* and the magnetism of the first magnetic blocks 142*c* are identical.

Further, the docking station 100*c* of this embodiment also includes a link 160*c* and an elastic member 170*c*. The link 160*c* is connected to the first magnetic sliding member 130*c* and the body portion 110. The elastic member 170*c* is disposed between the body portion 110 and one end 162*c* of the link 160*c* relatively away from the first magnetic sliding member 130. In addition, the docking station 100*c* further includes a plurality of position limiting pillars 180*c* disposed in the body portion 110, wherein the first magnetic sliding member 130*c* is slidably disposed on the position limiting pillars 180*c*.

With reference to FIG. 1A, FIG. 3A, and FIG. 3B together, when the pivoting portion 120 is located at the first position P1, a magnetic attraction force is generated as the third magnetic blocks 152*c* of the magnetic component 150*c* correspond to the first magnetic blocks 142*c* of the second magnetic sliding member 140*c*. A magnetic attraction force is generated as the fourth magnetic blocks 154*c* of the magnetic component 150*c* correspond to the second magnetic blocks 144*c* of the second magnetic sliding member 140*c*. At this time, the connector 122 of the pivoting portion 120 is stored in the accommodating groove 114 and is hidden without being exposed, therefore, through such design of the docking station 100*c*, the connector 122 is protected from being damaged by dusts or external forces.

After that, with reference to FIG. 1D, FIG. 3A, and FIG. 3C together, when the portable electronic component 200 abuts against the guiding surface 112 of the body portion 110 and slides toward the pivoting portion 120, a magnetic repulsion force is generated between the magnetic device 210 and the first magnetic sliding member 130*c*, the sliding block 132*c* of the first magnetic sliding member 130*c* is driven to slide in the sliding groove 146*c* of the second magnetic sliding member 140*c*, a magnetic repulsion force is generated as the first magnetic blocks 142*c* of the second magnetic sliding member 140*c* is enabled to move to the fourth magnetic blocks 154*c* corresponding to the magnetic component 150*c*, and the pivoting portion 120 pivots from the first position P1 to the second position P2 to expose the connector 122 through the magnetic repulsion force, so as to electrically connect with the portable electronic component 200. That is, the pivoting portion 120 is driven by a mechanical force, such that the pivoting portion 120 automatically pivots to expose the connector 122.

When the pivoting portion 120 of the docking station 100*c* is intended to return back to the first position P1 from the second position P2, the pivoting portion 120 may be manually operated to be pivoted to the first position P1, and that elastic deformation is generated by the elastic member 170*c*, so the connector 122 of the pivoting portion 120 is stored in the accommodating groove 114.

Note that when the sliding block 132*c* of the first magnetic sliding member 130*c* slides in the sliding groove 146*c* of the second magnetic sliding member 140*c*, the first magnetic sliding member 130*c* moves in a first direction D1, the second magnetic sliding member 140*c* moves in a second direction D2, and the first direction D1 is perpendicular to the second direction D2. Herein, the first direction D1 is, for example, a Y direction, and the second direction D2 is, for example, a Z direction. In short, in the docking station 100*c* of this embodiment, moving directions of the first magnetic sliding member 130c and the second magnetic sliding member 140c are different, such that a magnetic force between the second magnetic sliding member 140c and the magnetic component 150c is changed from an original attractive force to a repulsive force thereby separate to achieve the action of automatically opening the pivoting portion 120 to expose the connector 122.

Figure 4A:
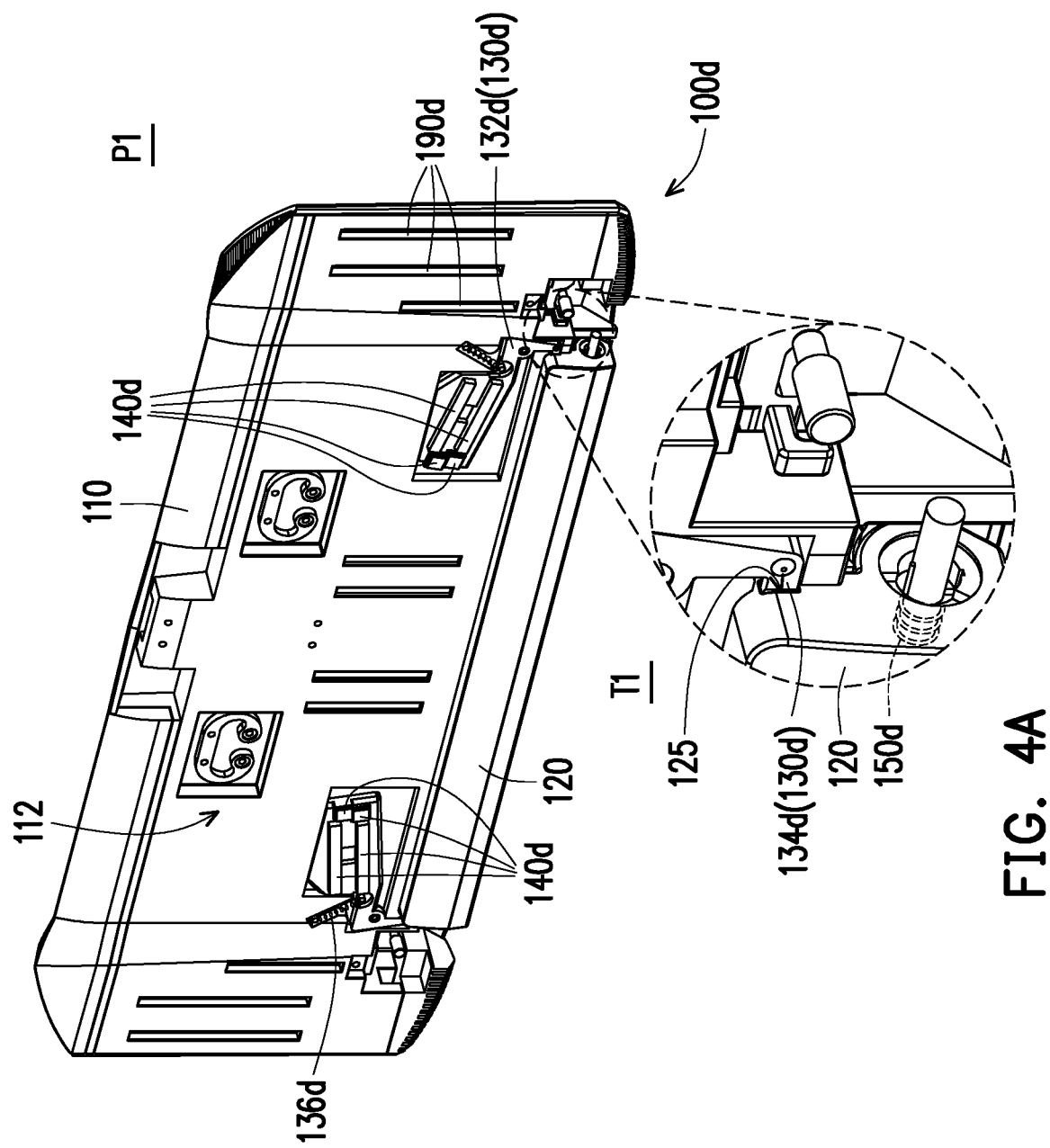
FIG. 4A and FIG. 4B are schematic three-dimensional views respectively illustrating relative positions between a pivoting portion in the first position and the second position and a body portion in a docking station according to another embodiment of the invention.
Figure 4B:
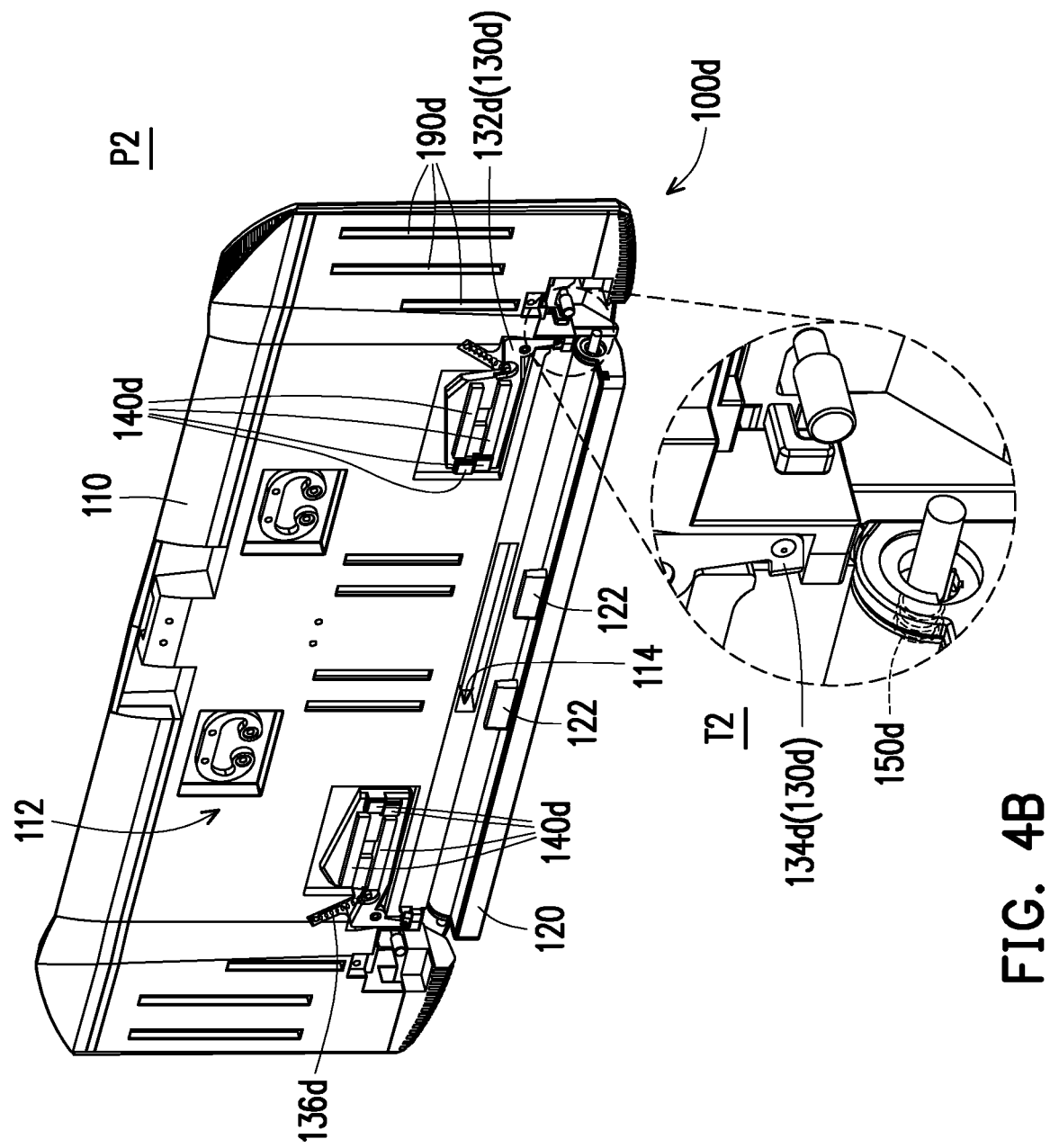

FIG. 4A and FIG. 4B are schematic three-dimensional views respectively illustrating relative positions between a pivoting portion in the first position and the second position and a body portion in a docking station according to another embodiment of the invention. With reference to FIG. 1A and FIG. 4A, a docking station 100d of this embodiment is similar to the docking station 100a of FIG. 1A, and a difference therebetween is: other members are used to replace the first magnetic block 130a, the pivoting component 140a, and the second magnetic block 150a of FIG. 1A in the docking station 100d of this embodiment.

To be specific, the docking station 100d of this embodiment further includes a hook component 130d, a plurality of magnetic blocks 140d, and at least one elastic member 150d. The hook component 130d is pivoted into the body portion 110 and is adapted to pivot between an engaging position T1 and an open position T2. The hook component 130d includes a hook body 132d and at least one hook 134d. The magnetic blocks 140d are disposed on the hook body 132d of the hook component 130d. The elastic member 150d is disposed between the body portion 110 and the pivoting portion 120. Further, the docking station 100d of this embodiment also includes a plurality of positioning magnets 190d disposed on the body portion 110 separately from one another, so the portable electronic component 200 may be positioned more securely. In addition, the hook component 130d of this embodiment further includes a return spring 136d connected to the body portion 110 and the hook body 132d and configured for enabling the hook component 130d to return back to the engaging position T1 from the open position T2.

With reference to FIG. 1A and FIG. 4A together, when the pivoting portion 120 is located at the first position P1, the hook 134d of the hook component 130d is engaged with an engaging slot 125 of the pivoting portion 120, such that the hook component 130d is located at the engaging position T1. That is, the pivoting portion 120 of this embodiment is secured through the hook 134d of the hook component 130d. At this time, the connector 122 of the pivoting portion 120 is stored in the accommodating groove 114, meaning that the connector 122 of the pivoting portion 120 is hidden without being exposed, and the connector 122 is thereby protected from being damaged by dusts or external forces through such design of the docking station 100d.

After that, with reference to FIG. 1B and FIG. 4B together, when the portable electronic component 200 abuts against the guiding surface 112 of the body portion 110 and slides toward the pivoting portion 120, a magnetic attraction force is generated between the magnetic device 210 and the magnetic blocks 140d, the hook component 130d is driven to pivot from the engaging position T1 to the open position T2, so the hook 134d of the hook component 130d is not engaged with the engaging slot 125 of the pivoting portion 120, and the pivoting portion 120 pivots from the first position P1 to the second position P2 to expose the connector 122 through elastic potential energy released by the elastic member 150d, so as to electrically connect with the portable electronic component 200. That is, when the hook 134d of the hook component 130d is not engaged with the engaging slot 125 of the pivoting portion 120, the pivoting portion 120 may be opened through an elastic force of the elastic member 150d.

When the pivoting portion 120 of the docking station 100d is intended to return back to the first position P1 from the second position P2, the pivoting portion 120 may be manually operated to be pivoted to the first position P1, and the return spring 136d enables the hook component 130d to return from the open position T2 back to the engaging position T1, so that the connector 122 of the pivoting portion 120 is stored in the accommodating groove 114.

In view of the foregoing, in the design of the docking station of the embodiments of the invention, when the portable electronic component abuts against the guiding surface of the body portion and slides toward the pivoting portion, the driving force (i.e., the mechanical force or the magnetic force) is generated, and the pivoting portion is driven to pivot from the first position to the second position to expose the connector, so as to electrically connect with the portable electronic component. That is, the design of the docking station allows the docking station to keep a simple appearance and to be used in a more intuitive and convenient way. In other words, when the docking station does not carry the portable electronic component, the connector of the pivoting portion is hidden without being exposed, so that the connector is protected from being damaged by dusts or external forces.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A docking station, comprising:
    a body portion, having a guiding surface;
    a pivoting portion, pivoted with the body portion and having a connector, wherein a driving force is generated when a portable electronic component abuts against the guiding surface of the body portion and slides toward the pivoting portion, and the pivoting portion is driven to pivot from a first position to a second position to expose the connector so as to electrically connect with the portable electronic component;
    a first magnetic sliding member, disposed in the body portion and having a sliding block; and
    a second magnetic sliding member, disposed in the body portion and having a sliding groove, at least one first magnetic block, and at least one second magnetic block, wherein the first magnetic sliding member is slidably disposed on the second magnetic sliding member, the sliding block is located in the sliding groove, magnetism of the at least one first magnetic block and magnetism of the at least one second magnetic block are different, and the at least one first magnetic block and the at least one second magnetic block are separated from each other.

2. The docking station as claimed in claim 1, further comprising:
    a magnetic component, disposed in the pivoting portion and comprising at least one third magnetic block and at least one fourth magnetic block, wherein the at least one third magnetic block and the at least one fourth magnetic block are separated from each other, magnetism of the at least one third magnetic block and the magnetism of the at least one second magnetic block are identical, and magnetism of the at least one fourth magnetic block and the magnetism of the at least one first magnetic block are identical.

3. The docking station as claimed in claim 2, wherein a magnetic attraction force is generated as the at least one third magnetic block of the magnetic component corresponds to the at least one first magnetic block of the second magnetic sliding member and a magnetic attraction force is generated as the at least one fourth magnetic block of the magnetic component corresponds to the at least one second magnetic block of the second magnetic sliding member when the pivoting portion is located at the first position.

4. The docking station as claimed in claim 3, wherein the portable electronic component comprises a magnetic device, a magnetic repulsion force is generated between the magnetic device and the first magnetic sliding member when the portable electronic component abuts against the guiding surface of the body portion and slides toward the pivoting portion, the sliding block of the first magnetic sliding member is driven to slide in the sliding groove of the second magnetic sliding member, a magnetic repulsion force is generated as the at least one first magnetic block of the second magnetic sliding member is at least enabled to move to the at least one fourth magnetic block corresponding to the magnetic component, and the pivoting portion pivots from the first position to the second position to expose the connector through the magnetic repulsion force.

5. The docking station as claimed in claim 4, wherein the first magnetic sliding member moves in a first direction and the second magnetic sliding member moves in a second direction when the sliding block of the first magnetic sliding member slides in the sliding groove of the second magnetic sliding member, and the first direction is perpendicular to the second direction.

6. The docking station as claimed in claim 2, further comprising:
a link, connected to the first magnetic sliding member and the body portion; and
an elastic member, disposed between the body portion and one end of the link relatively away from the first magnetic sliding member.

7. The docking station as claimed in claim 2, further comprising:

a plurality of position limiting pillars, disposed in the body portion, wherein the first magnetic sliding member is slidably disposed on the position limiting pillars.

8. The docking station as claimed in claim 1, wherein the portable electronic component comprises an electrical connector, and the electrical connector of the portable electronic component electrically connects with the connector of the pivoting portion when the pivoting portion is located at the second position, and that the portable electronic component is positioned on the pivoting portion.

9. The docking station as claimed in claim 8, wherein the body portion has an accommodating groove, and the connector of the pivoting portion is stored in the accommodating groove when the pivoting portion is located at the first position.

10. An electronic apparatus, comprising:
a portable electronic component; and
a docking station, adapted to electrically connect with the portable electronic component and comprising:
a body portion, having a guiding surface;
a pivoting portion, pivoted with the body portion and having a connector, wherein a driving force is generated when the portable electronic component abuts against the guiding surface of the body portion and slides toward the pivoting portion, and the pivoting portion is driven to pivot from a first position to a second position to expose the connector so as to electrically connect with the portable electronic component;
a first magnetic sliding member, disposed in the body portion and having a sliding block; and
a second magnetic sliding member, disposed in the body portion and having a sliding groove, at least one first magnetic block, and at least one second magnetic block, wherein the first magnetic sliding member is slidably disposed on the second magnetic sliding member, the sliding block is located in the sliding groove, magnetism of the at least one first magnetic block and magnetism of the at least one second magnetic block are different, and the at least one first magnetic block and the at least one second magnetic block are separated from each other.

\* \* \* \* \*